United States Patent [19]

Adamchick et al.

[11] 4,122,520

[45] Oct. 24, 1978

[54] MICROCOMPUTER CONTROLLER AND DIRECT MEMORY ACCESS APPARATUS THEREFOR

[75] Inventors: John T. Adamchick, Amsterdam; John C. Sicko; Edwin C. Underkoffler, both of Schenectady, all of N.Y.

[73] Assignee: General Electric Company, Schenectady, N.Y.

[21] Appl. No.: 799,299

[22] Filed: May 23, 1977

[51] Int. Cl.² .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,931,613 | 1/1976 | Gruner et al. | 364/200 |
| 3,934,227 | 1/1976 | Worst | 364/200 |
| 3,986,170 | 10/1976 | Valassis et al. | 364/200 |
| 4,016,541 | 4/1977 | Delagi et al. | 364/200 |
| 4,024,506 | 5/1977 | Spaargaren | 364/900 |
| 4,047,157 | 9/1977 | Jenkins | 364/200 |
| 4,056,848 | 11/1977 | Gilley | 364/200 |

*Primary Examiner*—Melvin B. Chapnick
*Attorney, Agent, or Firm*—Geoffrey H. Krauss; Joseph T. Cohen; Marvin Snyder

[57] ABSTRACT

A microcomputer controller for a printer, and apparatus for facilitating direct memory access to the microcomputer, includes a central processing unit (CPU) with a known set-up time at the beginning of each machine cycle. A memory, associated with the CPU, has an access time less than the CPU set-up time. A pair of three-state buffers are utilized on the address bus to, and the data bus to and from, the memory from each of the CPU and a direct memory access (DMA) port. A DMA control circuit is coupled to the three-state buffers to facilitate direct access to the memory, from the DMA port, during CPU set-up time intervals and also returns control of memory access to the CPU when the set-up, or synchronization, time interval ends. The microcomputer controller is utilized with additional memory, of the read-only type, and shift registers for realizing a printer controller capable of receiving print character data from the DMA port and causing that data to be printed as the associated symbol, indicia and the like, in a print font selected responsive to incoming data.

10 Claims, 7 Drawing Figures

MICROCOMPUTER CONTROLLER AND DIRECT MEMORY ACCESS APPARATUS THEREFOR

BACKGROUND OF THE INVENTION

The present invention relates to direct memory access apparatus for use in a computer system and, more particularly, to novel DMA apparatus utilized with a microcomputer system for altering the contents of memory without altering the speed of central processing unit operation.

Generally, the central processing unit (CPU) of a computer system, and especially of a microcomputer system, executes each of a plurality of instructions in sequential manner. Each instruction typically requires one or more machine cycles with each machine cycle requiring several cycles of a master clock frequency, and hence a calculable time interval, for completion. Such systems may be configured to operate in a direct memory access (DMA) mode, whereby data is written into, or read from, a system memory means from a source other than the CPU; the CPU is generally halted during the DMA time interval, causing the through-put of the CPU to be drastically reduced. In at least one known microcomputer sytem, the use of the DMA mode requires that at least one complete machine cycle, consisting of several clock periods, be given up (and the CPU kept idle) to allow each direct memory access to be completed. Frequent direct memory accessing can slow the average instruction completion time by a relatively large factor. It is, therefore, desirable to provide direct memory access apparatus which does not interrupt the operation of the CPU and does not affect the average time for completion of a CPU instruction, even while allowing a direct memory access to occur at least once in each instruction cycle, and preferably at least once in each machine cycle.

BRIEF DESCRIPTION OF THE INVENTION

In accordance with the invention, direct memory access apparatus for a high speed microprocessor controller is provided. The microprocessor controller has a central processing unit having a known set-up, or synchronization, time and memory means having a plurality of addressable data word storage sites accessible in a time interval less than the CPU synchronization time. The direct memory access (DMA) apparatus includes first means for presenting an address word to the memory means from the CPU and second means for connecting the data port of the memory means with the data bus to the CPU, both responsive to a first condition. The DMA apparatus also includes third means for presenting an address word to the memory means from a direct memory access address port and fourth means for coupling the memory means data port to a direct memory access data port, both responsive to a second condition different from the first condition. A control means for recognizing the synchronization time interval of the CPU to apply the second condition to the third and fourth means to facilitate a direct memory access operation while the CPU is performing internal operations; while an inverter, coupled to the output of the control means, applies the first condition to the first and second means at all other times, to facilitate communication between the CPU and the memory means.

In one preferred embodiment, the first through fourth means are each a plurality of three-state buffers, equal in number to the number of bits on respectively each of the address and data busses between the memory and, respectively, the CPU and the DMA port. A preferred control means includes a logic inverter for enabling the buffers between the memory means and each of the CPU and the DMA port in mutually-exclusive fashion and a logic gate for driving the inverter and the third and fourth buffers only when a direct memory access is requested, via an external control port, during the CPU synchronization interval.

A high-speed printer controller utilizing the novel DMA apparatus utilizes a first-in-first-out (FIFO) shift register as the fourth means, to facilitate a shift of coded character data only from memory to one of a plurality of dedicated read-only memory (ROM) means for generating line-by-line dot matrix representations of an entire line of characters to be printed. Character data for each sequential character, along one line to be printed, appears at an input-output (I/O) port and is loaded into the microcomputer memory means as part of the normal programmed operation of the CPU; data is retrieved from memory and routed to the FIFO register during each synchronization state of each machine cycle, if the FIFO register is less than full. In this manner, at least one full line of characters is always stored in memory and a portion of that line is always present in the FIFO shift register to allow continued high speed printing even if the CPU is carrying out an instruction requiring a relatively large number of machine states between successive synchronization intervals, and hence having a relatively large time interval between transfers of new character data from the microcomputer memory means into the FIFO shift register. Thus, both printing system character generation speed and controller CPU instruction speed are maintained even while a single memory means is shared by both portions of the overall system.

Accordingly, it is one object of the present invention to provide novel direct memory access apparatus for use with a microcomputer system.

It is another object of the present invention to provide such novel direct memory access apparatus capable of functioning without substantially reducing the throughput of the CPU with which it is associated.

It is yet another object of the present invention to provide novel direct memory access apparatus for use with a microcomputer controller for a high speed printer.

These and other objects of the present invention will become apparent upon consideration of the following detailed description and the drawings.

DETAILED DESCRIPTION OF THE INVENTION

Referring initially to FIGS. 1 and 1a–1c, a preferred embodiment of our direct memory access apparatus is described with reference to a computer subsystem 10, illustratively being of the microprocessor type. Computer system 10 contains a central processing unit and system controller section (CPU) 11, operating in conjunction with a two-phase clock generator 12 supplying first and second clock signals, $\phi_1$ and $\phi_2$, respectively, to the CPU. CPU 11 generates a multi-bit digital word at an address port 11a coupled to a first portion 14a of an address bus 14. The address word is normally routed to another portion 14b of the address bus at the address input port 16a of memory means 16 associated with the computer system. Upon receipt of a valid address for digital data stored in memory means 16, coincident with the proper binary state of a read-write control signal on read-write ($\overline{R}/W$) control line 18 (which signal emanates from CPU 11) memory means 16 receives or transmits, at a memory data port 16b, a data word to a first portion 20a of a bi-directional data bus, with the data word being routed to another data bus portion 20b at a data input port 11b of the CPU.

Figure 1:
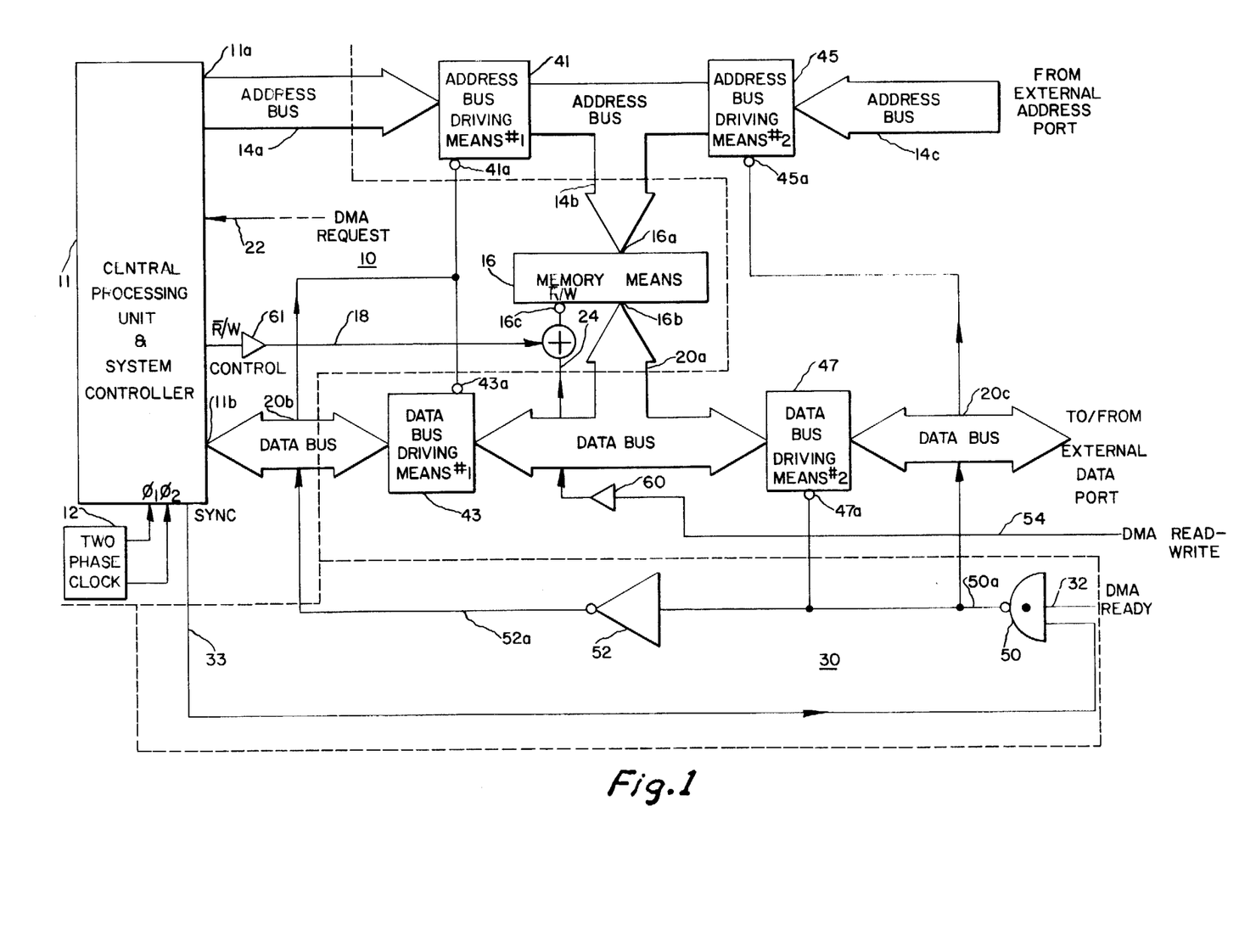
FIG. 1 is a schematic block diagram of a central processing unit, memory means and one embodiment of the novel direct memory access apparatus in accordance with the principals of the present invention.
Figure 1A:
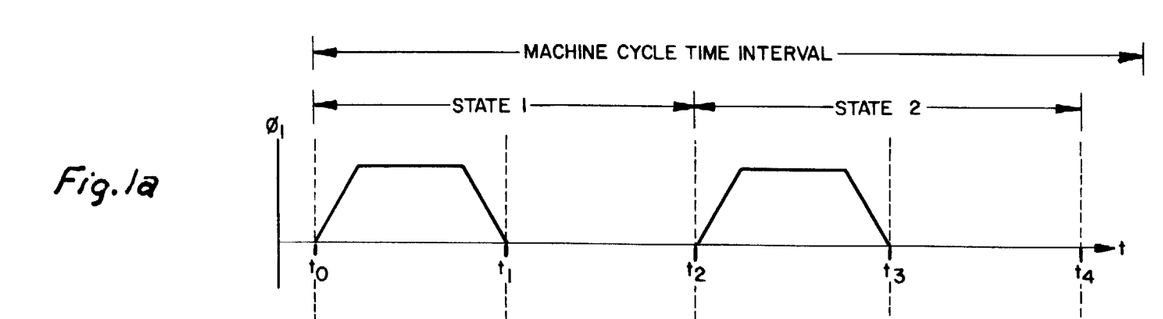
FIGS. 1a, 1b and 1c are coordinated graphs illustrating clock and synchronization signals for a microcomputer, as illustrated in FIG. 1, and useful in understanding the operation of the novel direct memory access apparatus of the present invention.
Figure 1B:
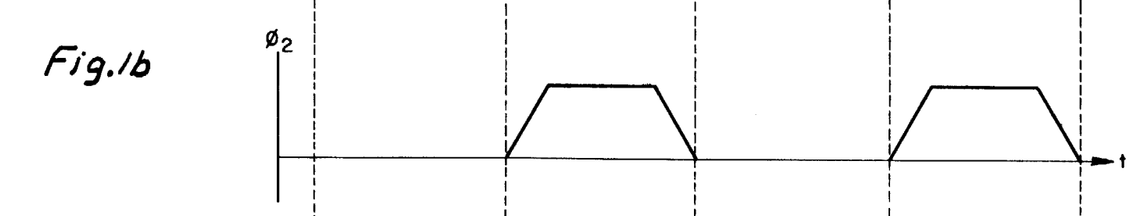
Figure 1C:
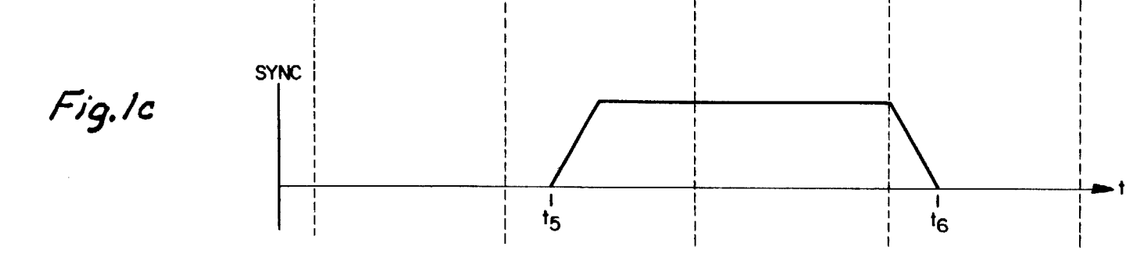

Illustratively, CPU 11 may be comprised of a 8080A microprocessor and an 8228 system controller, while clock means 12 may comprise an 8224 clock generator; address bus 14 is a 16-bit-wide parallel bus and data bus 20 is an 8-bit-wide parallel, bi-directional bus. Memory means 16 may comprise a block of random-access-read/write (RAM) memory, with or without additional blocks (within the maximum memory space addressable by the CPU) of addressable read-only memory (ROM), in manner known to the art and as required by the specific end use of the computational system. It should be understood that, while the present invention is illustrated with reference to a particular CPU and its family of supporting and peripheral devices, other CPUs, having greater or lesser data-bus and address-bus widths and parallel processing capacity, may be utilized within system 10.

Preparatory to setting forth our novel direct memory access apparatus, it should be understood that all instructions to be executed by, and all data supplied to and from, CPU 11 are normally stored within memory means 16. In the course of program execution, access to a particular location in memory requires the presentation of the proper address by CPU 11, via address bus 14 to memory means 16; the state of the read-write control line 18 is sensed at a read-write ($\overline{R}/W$) input 16c of the memory means to control the writing into memory means 16, during the presence of a "write" (W) condition or the reading from memory means 16 during the presence of a "read" ($\overline{R}$) condition, of data respectively onto and from data bus portion 20a.

A direct memory access (DMA) mode is known wherein a DMA request line 22 is enabled to control CPU 11 to halt, remove all addresses from address bus 14 and ignore all information on data bus 20. Address bus portion 14b now receives the address of a memory location from an external address port (AP) responsive to an external source; data to, or from, the memory means is supplied by or to, an external data port (PD); control of memory operation, i.e. "read" or "write", is controlled by the use of a memory read-write control line 24 from the external source to memory means read-write input 16c, via an external control port (Pc). Thus, the effect of the normal DMA request is to couple memory means 16 to external address, control and data ports (PA, PC and PD, respectively) while completely isolating CPU 11 from the memory means; during the time interval required for completion of a direct memory access, CPU 11 cannot continue its data processing functions and can no longer receive subsequent instructions or data. In fact, in the illustrated microcomputer system, a DMA request causes the CPU to come to a complete halt and remain idle for the entire DMA interval. In situations where blocks containing many words of data must be written into or read from memory means 16 by direct memory access, the normal DMA apparatus places the CPU in a hold mode for significant percentages of total system time, effectively reducing the CPU throughput.

We have found that the direct memory access function can be accomplished without substantial reduction of CPU throughput by enabling a direct access to memory means 16 only during those portions of a normal CPU cycle in which the CPU is not utilizing either the address bus 14 or the data bus 20. By placing the foregoing constraint on a DMA function, the CPU continues its data processing function without "awareness" that its associated memory means 16 is being utilized for other purposes. Our invention utilizes a means 30 for acquiring information from CPU 11 indicative of each sequential time interval during which the CPU is internally engaged, such that a direct memory access operation (if carried out within the internal operation time interval) will have substantially no effect on CPU throughput. Means 30 enables a direct memory access operation, if a direct memory access control port indicates a "ready" (DMA ready) signal, on line 32, during the time interval in which the CPU is internally engaged.

Illustratively, for the 8080A-type microprocessor, the time interval required to complete each of a plurality of serial instructions contains at least one, and typically several, machine cycles. Each machine cycle time interval consists of several, typically between three and five, clock states, defined as the time interval (FIGS. 1a and 1b) between successive leading edges of the $\phi_1$ clock pulses. In the 8080A-type microprocessor, utilizing a non-overlapping two-phase clock, the first clock phase $\phi_1$ is present during a first portion of each state of a machine cycle, e.g. the time interval between $t_0$ and $t_1$, in the first state of a machine cycle, while the second clock phase $\phi_2$ is present during the remaining time intervals, e.g. from time $t_1$ to $t_2$ of the first state. It should be understood that only the first two states of a machine cycle, typically having at least three states, are shown for purposes of simplicity. The 8080A-type microprocessor generates a synchronization (Sync.) signal (FIG. 1c) on line 33 which is enabled at a time $t_5$ slightly after the leading edge of the first $\phi_2$ clock signal in the first state and is disabled at a time $t_6$ slightly after the leading edge of the next $\phi_2$ clock signal. The sync. signal is indicative of the CPU and system controller being occupied with internal CPU functions, and meets the criteria for a "DMA-available" gating signal for our recognition means 30. The time interval, from time $t_5$ to $t_6$, establishes the maximum operational time of the memory, i.e. the time required for data to be stably received in (during writing) or stably transmitted from (during reading) after the address of the desired memory word is made available at the memory address port. This operational time must be less than the sync. time interval. Illustratively, in an 8080A-type microprocessor system utilizing a 500 nanosecond time interval between successive leading edges of the phase I or phase II clock signals $\phi_1$ and $\phi_2$, respectively, a total sync. time interval $(t_6-t_5)$ of about 500 nanoseconds is required and memory access times of up to 350 nanoseconds are satisfactory and readily achievable. Thus, the direct memory access method of our invention is useful with any microcomputer in which a definable time interval exists during which the central processing unit is carrying out internal operations, and requires that the memory means have an access time sufficiently less than this CPU-internal-processing time interval, whereby the memory means is accessed and the reading or writing process is complete prior to the cessation of the internal processing interval of the CPU, when the address and data busses of the CPU must effectively be coupled to the address and data ports of the memory means. Similarly, a further requirement is that the address, control and data ports from the external apparatus, desiring direct memory access, be effectively decoupled from the memory means and the microcomputer sub-system during normal CPU operation.

In one preferred embodiment, the bus decoupling function is performed by three-state buffer means placed between the memory address and data ports and each of the associated address and data ports of the CPU subsystem and the external source. Thus, a first address-bus driving means 41 is positioned between address bus portion 14a, from CPU 11, and address bus portion 14b at memory means address input port 16a. Bus driving means 41 may be of a unidirectional type, as information flows only from the CPU to the memory means. A second three-state buffer means 43, of a bi-directional type, is placed between data portion 20b, at CPU data port 11b and data bus portion 20a at memory means data port 16b. Each of bus driving, or buffer, means 41 and 43 have a control input 41a and 43a, respectively, which enables data transmission through the associated buffer means when the control input is enabled to a first binary condition, herein illustrated as a binary-zero value, and effectively opens the connection between the bus portions coupled to the CPU and the memory means, when the control input is enabled to the remaining binary condition, herein a binary one value. Similarly, a second (uni-directional) address bus driving means 45 is utilized to selectively couple another address bus portion 14c, from an external address port, to the address bus portion 14b at memory means address port 16a. A second (bi-directional) data bus driving means 47 is utilized to selectively couple another data bus portion 20c, carrying data to/from an external data port, to the data bus portion 20a coupled to memory means data port 16b. Address buffer 45 and data buffer 47 have control inputs 45a and 47a, respectively, having operational characteristics similar to the control inputs 41a and 43a of the first address and first data buffer means 41 and 43, respectively.

DMA control means 30 utilizes a two-input NAND gate 50 having a first input coupled to DMA READY control line 32 and having its remaining input receiving the sync. signal on line 33 from CPU 11. The output 50a of the NAND gate is enabled to a binary-zero level only if the external apparatus is requesting a direct memory access, as signified by a binary-one level on the DMA read control line 32, and the CPU synch. output is enabled to a binary one level (during the time interval between time $t_5$ and time $t_6$) while the CPU is busy with internal processing. When gate output 50a is enabled to the binary-zero level, control inputs 45a and 47a of second address bus driving means 45 and second data bus driving means 47, respectively, enable the connection, respectively, of data bus portion 20c (from the external data port) to memory means data port 16b, and address bus portion 14c (from the external address port) to memory means address port 16b. A logic inverter 52 receives the binary-zero level from gate output 50a and generates a logic-one binary level at the output 52a of the inverter, which binary-one level is coupled to first address bus driving means control input 41a and first data bus driving means control input 43a, disabling both driving means and effectively isolating address bus portion 14a from address bus portion 14b (at the memory input), and the data bus portion 20b from the data bus portion 20a (at the memory means data port). A DMA read-write control line 54 is coupled from the external, DMA-requesting source to the memory means $\overline{R}/W$ control port 16c in OR'd configuration with the $\overline{R}/W$ control line 18 from the CPU; buffers 60 and 61 may be required to isolate the CPU $\overline{R}/W$ output from the DMA read-write control line and vice versa. A direct memory access operation may now be completed between memory means 16 and an external apparatus, prior to the removal of the binary-one level on the CPU sync. line 33.

Upon cessation of the CPU internal processing time interval, the signal on sync. line 33 reverts to the binary zero logic level, disabling NAND gate 50 and causing its output 50a to return to the logic one level. Control inputs 45a and 47a receive the logic one level and effectively de-couple address bus portion 14c from memory means address bus portion 14b, and external data port data bus portion 20c from memory means data port portion 20a at the data bus, effectively isolating the external apparatus from the memory means. Simultaneously therewith, the logic one output of the gate is inverted to appear as a logic-zero level at inverter output 52a and control inputs 41a and 43a, to couple CPU address bus portion 14a to memory means address bus portion 14b, and CPU data bus portion 20b to memory means data bus portion 20a, *facilitating addressing of the memory means and transfer of instructions and/or data between the CPU and the memory means for normal computer operation.*

It should be understood that if memory means 16 is configured of a memory type having a sufficiently fast access time, a plurality of sequential direct memory access operations may be allowed to occur during each enablement of the logic gating means 50 of the control section 30. Thus, if memory means 16 has an access time of about 100 nanoseconds, with an equal time period (100 nanoseconds) being allowed thereafter to assure acquisition of the memory data by the external apparatus, then a complete DMA operation takes place in about 200 nanoseconds and two complete DMA operations can occur in each synchronization time interval $(t_6-t_5)$ of about 500 nanoseconds duration.

Figure 2:
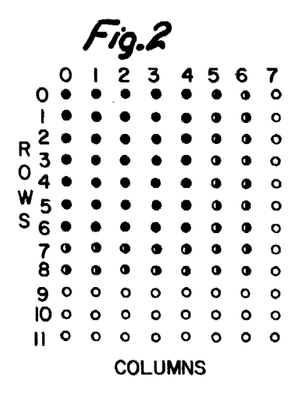
FIG. 2 is a representation of a dot matrix field and useful in understanding the operation of a high speed printer utilizing a microcomputer-memory system and the novel direct memory access apparatus of the present invention.

Our novel direct memory access apparatus is particularly useful, in conjunction with other apparatus to be described hereinbelow, in controlling a high speed printer, capable of forming a plurality of characters, symbols and other viewable indicia at each of a plurality of positions (typically 136 in number) along a single line of characters. The characters are printed in dot-matrix fashion as illustrated in FIG. 2, wherein each character position is defined by an M×N array of dot positions comprising M=12 horizontally disposed rows (row 0 to row 11) and N=8 vertically disposed columns (column 0 to column 7). The characters may be printed in the standard 5×7 character font by selectively "inking" dots at selected ones of the 35 positions (shown by the fully shaded dot) comprising rows 0–6 between columns 0–4. Other standard character fonts may be utilized, such as the 7×9 font wherein dots are "inked" at selected ones of the positions (shown by the fully shaded plus the half-shaded dots) defined by the intersections of the 9 rows between row 0 and row 8, and the 7 columns between column 0 and 6. Thus, at least the right-hand-most column (column 7) is not printed, to provide a space between characters, while at least the lower three rows (rows 9, 10 and 11) are also not printed to provide a horizontal space between character lines. It should be understood that other fonts may be utilized, possibly with the expansion of the number of columns and rows, as, for example, by increasing the number of columns to 10, to enable a 9×11 character font to be utilized. Similarly, it should be understood that other fonts, utilizing the entire plurality of dot positions in the matrix for each character position, may be used for purposes such as graphical illustration and the like, i.e. applications wherein unprinted spaces are not required or desired in the end representation. In any event, in the printer of our example, the characters are formed by sequentially printing at matrix positions along each sequential row, commencing by printing the lowest column (column 0) to the highest column (column 7, if used) of the first row (row 0) and thence along rows 1 to 11 (to the extent used) sequentially.

Figure 3A:
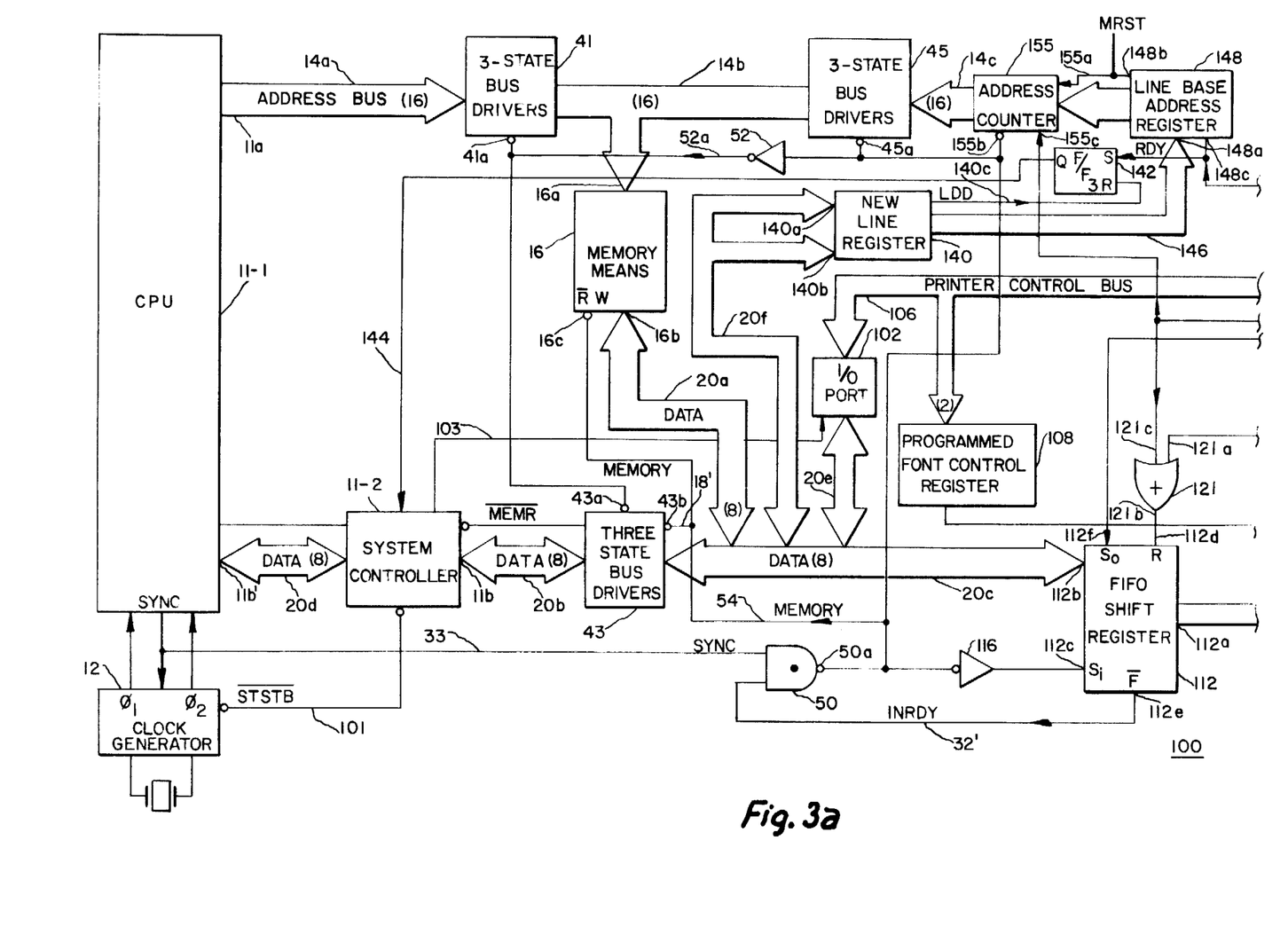
FIGS. 3a and 3b are coordinated portions of a schematic block diagram of the microcomputer controller, memory means and direct memory access apparatus utilized in a high speed printer embodiment.
Figure 3B:
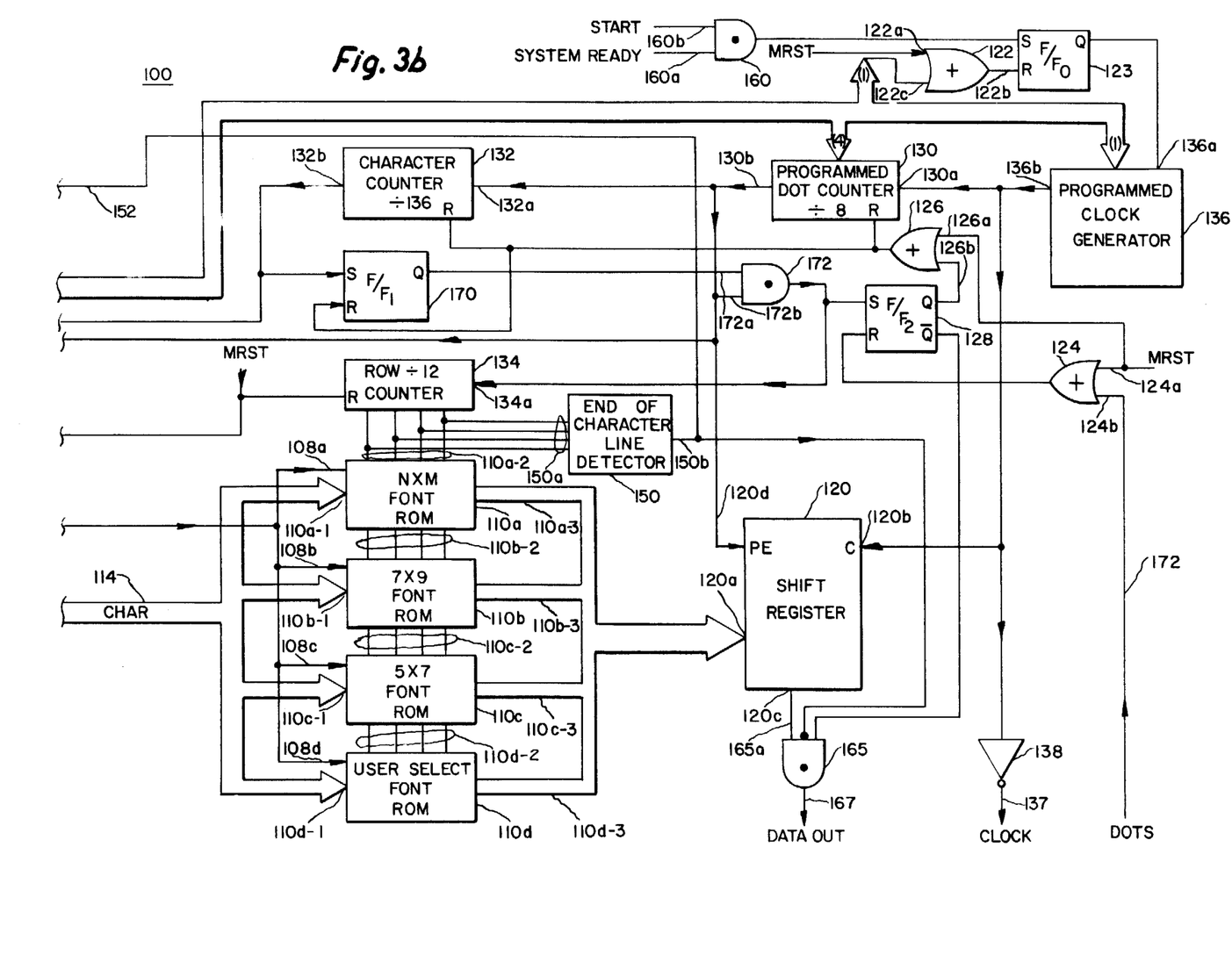

With this background in mind, reference is now made to the coordinated schematic block diagram of FIGS. 3a and 3b, wherein a printer controller 100 is illustrated, with like elements having like designations with reference to FIG. 1.

The CPU 11-1 itself has a data port 11b' interconnected to the system controller 11-2 via an extension 20d of the 8-bit-wide data bus; as is well known for the illustrative 8080A-type microprocessor, during generation of the synchronization signal on line 33, a status strobe ($\overline{STSTB}$) signal on a line 101, between clock generator 12 and system controller 11-2, causes CPU status information to be transferred to the system controller, while the data port 11b from the CPU-system controller sub-group presents no data to, and receives no data from, data bus portion 20b.

An input-output (I/O) port 102 receives programming and general information from an external source, or outputs printer status information, responsive to control signals transmitted to an I/O control line 103 from the system controller, as directed by CPU programming. I/O port 102 is also used, in this apparatus, to receive character data for at least one line of characters to be printed and to allow the character data to be loaded into memory under microprocessor control. The memory means stores up to three full lines of character data, e.g. the first line to be printed being stored at memory decimal addresses 000 to 136, the second line at decimal addresses 137 to 272, and the third line at decimal addresses 273 to 408; as the lines are presented in scrolled manner (e.g. the next full line is read from memory while subsequent lines fill the now-vacant storage area of previously printed lines), the external data source does not have information as to the address at which a new line is to be stored and a DMA operation cannot be utilized for this portion of the data transfer sequence - the transfer must be under I/0 control of the CPU.

The I/0 port 102 is not only coupled to data bus portion 20c by a data bus extension 20e, for character line data transfer, but may also be programmed to transfer printer format data, derived from the external source (such as the output register of a master computer and the like) via an 8-bit-wide printer control bus 106. Two bits of the byte carried on control bus 106 are recognized by, and stored in, a programmed font control register 108 to energize one of a set of four output lines 108a–108d, each individually coupled to the enabling (chip select) input of an associated read only memory 110a–110d. Each of ROMs 110 is programmed to translate 8-bit ASCII character bytes - received from the output 112a of a first-in-first-out (FIFO) shift register 112 via a character bus 114 coupled to a first set of inputs 110a-1 to 110d-1, respectively, of the associated ROM — for conversion to a dot representation of a row of the matrix, with the proper row being selected by the four-bit-row-select pattern at parallel connected, remaining address inputs 110a-2 to 110d-2, respectively. The dot pattern required, in accordance with the selected row of the character required to be printed, appears at the output 110a-3 to 110d-3, respectively (of the ROM selected by the signals on select lines 108a–108d), as an 8-bit-wide word and is routed to the data input 120a of an 8-bit shift register 120 for clocked shift to the printing mechanism of the printer. The FIFO shift register 112 has its 8-bit-wide data input 112b coupled to data bus portion 20c and is configured to operate as a receive-only direct memory access port. The shift register has a shift-in ($S_i$) control input 112c which, when disabled causes shift register 112 to ignore all data at data input port 112b; thus, the fourth three-state data bus driving means 47, of FIG. 1, is not required as the shift register only reacts to data on data bus 20c when shift-in control input 112c is at a binary one level, as enabled by an inverting buffer 116 coupled to the output 50a of the DMA control means gate 50. As the shift register operates as the DMA data port, and then only for reading data from memory means 16, the DMA read-write line 54 may be coupled directly at the output of the DMA control gate 50, which gate will have the necessary binary zero (read) level whenever a direct memory access operation is enabled to read data to shift register 112. Memory line 54 is in wire-OR'd connection with the memory-read ($\overline{MEMR}$) line 18' from the CPU and system controller as buffered by three-state bus driver 43. (A separate memory-write line (not shown) is routed to memory means 16 to prevent enabling $S_i$ input 112c during a CPU initiated memory-write cycle).

In operation, upon application of power to the printer, a master reset (MRST) signal is applied to: a first input 121a of a first OR gate 121, having its output 121b tied to a reset (R) input 112d of shift register 112 to clear the contents of that register; a first input 122a of a second 2-input OR gate 122, having its output 122b coupled to the reset (R) input of a control set-reset flip-flop (F/F$_0$) 123 to reset the output Q thereof; a first input 124a and 126a, respectively, of each of a pair of two-input OR gates 124 and 126, respectively, to respectively cause the output Q of another flip-flop (F/F$_2$)128 to be reset (establishing the remaining input 126b of OR gate 126 at a binary zero level) and to apply the proper logic level to the reset R inputs of a programmed dot counter 130 and a character counter 132; and a reset (R) input of a row-divide-by-12 counter 134 to reset the outputs thereof (coupled to ROM additional inputs 110a-2 and 110d-2) to a binary 0000 count, indicative of the first row (row 0) to be printed (see FIG. 2).

A clock generator 136 (programmed by one of the remaining dedicated bits of the byte on printer control bus 106) is disabled by the reset of the Q output of flip-flop 123, whereby the clock signal on both a line 137 (buffered by an inverter 138) to the printing mechanism and at the clock (C) input 120b of shift register 120, are suppressed to prevent clock and data signals from reaching the printing mechanism.

The CPU now receives a command via I/0 port 102, to start an input-and-memory store subroutine to cause at least one (and up to three) lines of character data to be stored at the proper locations, in memory means 116, as specified by a sequence of addresses generated by the CPU at its address port 11a. Upon receipt and storage of the character line data, the CPU sends a preselected "data" word. Another data bus extension 20f routes this word to a new-line-register (NLR) means 140, which is configured whereby a first portion of the parallel-bit data word is coupled to a control port 140a, and the remainder of the "data" word is coupled to a data port 140b. The appearance of the preselected bit pattern on the lines coupled to control port 140a cause register 140 to load the data bits present at data port 140b to establish the starting address (e.g. decimal address 000) of the first character line. Upon acceptance of the new line address, a registerloaded (LDD) output 140c is enabled to reset the Q output of a flag flip-flop 142 to couple a "continue" condition signal, via line 144, to the CPU subgroup. Simultaneously, the new line address stored in register 140 is coupled via a multi-bit bus 146 to the parallel data inputs 148a of a line-base-address (LBA) register means 148. The MRST signal is also coupled to a preset input 148b of LBA register means 148 to cause the new line address data at data input 148a thereof to be stored and made available at the inputs of memory address counter means 115. The MRST signal is also coupled to a preset input 155a of line base address register 148 to initially load therein (from LBA register means 148) the starting address of the immediate line to be, or presently being, printed (presently illustrated as the starting address of the first character line).

The FIFO shift register 112 (having been initially reset) is empty and a not-full ($\overline{F}$) output 112e is enabled to place a binary-one signal on a DMA-request, or in-ready (INRDY), line 32' coupled to one input of the DMA control gate 50. During each CPU synchronization period, the control gate output 50a drops to a binary zero level causing the following sequence of events to occur: three-state bus driver 45 receives an enabling (logic-zero) signal at its input 45a to couple the first memory address onto the address bus 14b; inverter 52 operates to provide a logic-one signal to control inputs 41a and 43a, respectively, of bus drivers 41 and 43, to disable communication between the CPU subgroup and the address and data ports 16a and 16b, respectively, of the memory means; the memory read-write control input 16c receives a logic-zero (read) control signal to cause memory means 16 to output to data bus portion 20c the first character byte stored at that address for receipt at data input 112b of the FIFO shift register; inverter 116 operates to provide a logic-one signal at $S_i$ control input 112c to cause shift register 112 to load and store the first character data byte; and finally, an advancecount input 155b of address counter 155 is enabled to increment the count stored therein by one, i.e. to the address of the memory location wherein the next character byte is stored.

The FIFO shift register is, in our preferred embodiment, capable of storing a sequential set of 16 character data bytes, whereby shifting of a first byte into the register does not disable the logic one signal at the not-full ($\overline{F}$) output 112e; direct memory access operations continue, during subsequent CPU synchronization periods and with incrementing of address counter 155 after each character data byte shift from the memory means, until shift register 112 is full, at which time output 112e is disabled, to disable DMA control gate 50. Thus, the shift register is loaded to capacity, e.g. 16 bytes, without affecting the operation of the CPU subgroup, and line printing is ready to commence.

During the routine just described, an end-of-character line detector means 150(having its inputs 150a coupled to the outputs of row counter 134 and configured to enable its output 150b only when receiving an input count equal to the binary number of the last row of dots to be printed for a character line, e.g. row 11, as illustrated) has its output 150b disabled to a binary-zero level responsive to MRST. The printing mechanism has been readied by commands from the CPU while the aforementioned DMA operations were taking place and signals now appear at both a SYSTEM READY input 160a and a START input 160b of an AND gate 160 to enable the set (S) input of flip-flop 123 and cause its Q output to be enabled and appear at the enabling input 136a of the clock generator, which has previously been programmed, via a dedicated bit of the data byte appearing on printer control bus 106, to a desired program clock frequency (indicative of the number of lines of characters to be printed per inch of printing media). Clock pulses appear at clock generator output 136b, are buffered by inverter 138, appear on printer mechanism clock line 137, and are also presented at shift register input 120b and programmed dot counter means input 130a.

The FIFO shift register 112 has previously been filled to capacity and thus presents the first character byte on bus 114 to that one of ROMs 110 previously selected for the desired font. Row counter 134, having previously been initialized, enables the ROM to present an 8-bit representation of the zero-th row of the first character to shift register input 120a. The eight sequential bits, each indicative of the printing state of a sequential dot position, are stored in shift register 120 and are serially clocked therefrom, at shift register output 120c, synchronous with sequential pulses from clock generator 136. The series sequential print bits are routed to a first input 165a of a three-input AND gate 165 and are gated by the now enabled signals from both the $\overline{Q}$ output of flip-flop 128 and the output of end-of-character-line detector means 150.

Programmed dot counter 130 counts the number of clock pulses required for shifting dot information for a single row of a single character position, e.g. six pulses for a 5×7 font, eight pulses (as illustrated) for a 7×9 font, etc., and enables a counter output 130b after the clock pulses signifying the last (inter-character) pulse for that character position. Enablement of output 130b causes the following activities to occur: the shift-out ($S_O$) control input 112f of the FIFO shift register 112 is enabled, to cause the shift register to present the next byte of character data to the selected ROM for transfer of a new 8-bit dot pattern (for the zero-th row of the second character) to be presented at data input 120a of the shift register; a binary one signal is presented at the preset enable (PE) input 120d of the shift register to load the new character data; and the clock input 132a of character counter 132 receives a count-advance pulse.

The print status of the eight sequential dot positions for the second character are now sequentially transmitted to the printing mechanism, in synchronism with the next eight clock pulses, via gate 165. Simultaneously therewith, the $\overline{F}$ output 112e of the FIFO register is enabled, as the first character data byte has been shifted from register 112 without replacement and the shift register is now less than full. During the next CPU synchronization interval, gate output 50a is enabled to the logic zero-level, shifting the next seventeeth) character data byte from memory means to the FIFO register 112 and advancing address counter 155 to the address of the next (i.e. the eighteenth) sequential character data byte, preparatory to the next request to fill shift register 112.

Shifting of each of the character data bytes continues sequentially, with only the first row (row zero) thereof being printed, until the full 136 characters have had their zero-th rows printed and character counter means 132 is filled to cause the output 132b thereof to be enabled, to: preset address counter means 155, via a preset input 155c to the initial address of the line being printed (obtained from LBA register 148); reset the FIFO shift register 112 via OR gate 121; and enable the set S input of a flip-flop 170 having its Q output coupled to the first input 172a of an AND GATE 172, whose other input 172b is coupled to the output 130b of the programmed dot counter means and is enabled at least at the same time as the enablement of character counter means output 132b. Thus, AND gate 172 enables the advance-count input 134a of the row counter means 134 at the end of a row (e.g. row 0) to advance the count on the four outputs thereof to that of the next row (e.g. row 1) of the character line (with end-of-character-line detector 150 remaining disabled until the count reaches the row number of the last row, e.g. row 11). The set S input of flip-flop 128 also is enabled to enable the Q output thereof to reset both programmed dot counter means 130 and character counter means 132 via OR gate 126, and to reset flip-flop 170, preparatory to printing the next row of dots for each of the 136 characters in the line.

Clock generator 136 continues to run, to allow the printing mechanism to perform a line-feed-and-return operation, with the reset signal maintained at counters 130 and 132 by flip-flop 128. When the printing mechanism is ready to print the next row of a character line, a DOTS signal appears on line 173, resetting the Q output of flip-flop 128 to remove the reset signals from counters 130 and 132. In the interim, the DMA operation has again filled FIFO shift register 112 with the first sixteen character data bytes of the line being printed; the DATA OUT gate 165 is enabled and printing of the next row of the character line commences.

The above sequence continues, with our novel DMA access apparatus functioning to keep the FIFO shift register 112 full, by transfer of the next sequential data character byte thereto during one of the synchronization intervals of the CPU. The sequence continues until the last row (illustratively, row 11, containing all "no print" dot instructions) is printed. At the initiation of a scan across this last row, the end-of-character-line detector 150 recognizes the binary 1011 pattern (for the 11 row) at its inputs 150a and enables output 150b to cause the following events to occur: gate 165 is disabled to prevent noise from appearing as print-dot signals to the printing mechanism (as the last row of the character line illustratively contains no printable information); enables a RDY signal at the set S input of flag flip-flop 142 to enable the Q output thereof for indicating to the CPU subgroup, via line 144, that character data for a new line of characters may be entered into memory means 16 (as one character line has been printed and may now be overwritten by character data for the next sequential character line); and enables an input 148c of LBA register 148 to accept the starting address of the block of memory space allocated to the next line to be printed, which starting address has previously been loaded into new line register 140 by the CPU, as part of its regular program, during printing of the previous line. When the new line base address is loaded, the first 16 characters of the next line to be printed are shifted into FIFO shift register 112, and counters 130, 132 and 134 are reset to cause printing of the next line of characters to follow. This sequence is then utilized for inputing each new line of character data and for utilizing the same for causing printing of characters when a particular line is in turn presented to the printer mechanism.

There has just been described novel apparatus for permitting direct memory access to the memory means of a microcomputer system without halting the data processing capability of the microcomputer central processing unit. A novel electronics subsection for a high speed microcomputer control line printer, utilizing this novel DMA apparatus is also shown.

While the present invention is described with reference to a preferred embodiment thereof, many variations and modifications will now become apparent by those skilled in the art. It is our intent, therefore, to be limited not by the specific disclosure herein but only by the scope of the appending claims.

What is claimed is:

1. Direct memory access apparatus for a microcomputer controller including a central processing unit (CPU) having an address port and a data port and having a known synchronization time interval, during which a synchronization signal is generated, at the beginning of each of a plurality of CPU machine cycles necessary to execute each of a plurality of instructions, and non-interleaved memory means having a single address port and a single data port for sequentially storing each of a plurality of individually addressable sequential data words therein, said apparatus comprising:
   direct memory access (DMA) address, data and control ports;
   first means for coupling the address port of said memory means to the address port of said CPU responsive only to the presence of a first signal;
   second means for coupling the data port of said memory means to the data port of said CPU responsive only to the presence of said first signal;
   third means for coupling said DMA address port to said memory means address port responsive only to the presence of a second signal present only when said first signal is not present;
   fourth means for coupling said DMA data port to said memory means data port responsive only to the presence of said second signal; and
   control means for recognizing the synchronization signal from the central processing unit to provide said second signal to said first through fourth means only if a direct memory access is requested at said DMA control port, said control means normally providing said first signal to said first through fourth means;

each of said plurality of sequentially addressable data words stored in said memory means being singly time-accessible to at least said DMA data port during each machine cycle and in a time interval less than, and only during, said synchronization time interval of said CPU after the address of the associated data word is transmitted to said memory means address port during the same synchronization time interval of said CPU.

2. Apparatus as set forth in claim 1, wherein at least one of said first through fourth means each comprises a buffer having an input coupled to the associated one of the CPU address and data ports and the DMA address and data ports, an output coupled to an associated one of the address and data ports of said memory means, and a control input; each said buffer having signals at the output thereof controlled by signals at the input thereof only when said control input is enabled, each said buffer output being essentially disconnected from the associated input whenever said control input is not enabled.

3. Apparatus as set forth in claim 1, wherein said control means comprises fifth means for performing a logical AND function of a third signal representing the DMA request from said DMA control port and said synchronization signal of said CPU to provide said second signal to said third and fourth means only when both said third and synchronization signals are present.

4. A controller for a high-speed dot-matrix printer, comprising:
- a microcomputer subsystem including a central processing unit (CPU) having an address port and a data port, said CPU having a known synchronization time at the beginning of each of a plurality of machine cycles necessary to execute each of a plurality of instructions; memory means for storing each of a plurality of individually addressable data words, said memory means having a single address port and a single data port and adapted to facilitate access to a selected one of said data words at said memory means data port after the address of said selected data word appears at said memory means address port in a time interval less than said CPU synchronization time; said microcomputer subsystem having an address bus extending between said CPU address port and said address port of said memory means and a data bus extending between said CPU data port and said data port of said memory means;
- input-output port means for transferring to and from apparatus external of said printer to said data bus between said memory means and said CPU, when enabled by said CPU, data words designating sequential printable symbols;
- first means in said address bus for coupling the address port of said memory means to the address port of said CPU responsive only to the presence of a first condition;
- second means in said data bus for coupling the data port of said memory means to the data port of said CPU responsive only to the presence of said first condition;
- third means for addressing locations within said memory means at which data words designating sequential printable symbols are stored;
- fourth means for coupling said third means to the memory means address port responsive only to the presence of a second condition different from said first condition;
- shift register means for receiving, responsive to the presence of said second condition, each of a sequence of said printable symbol data words from said memory means for sequential storage, the first symbol data word stored in said shift register means being the first symbol data word sequentially shifted to an output thereof;
- control means for recognizing the synchronization time interval of the CPU to enable the presence of said second condition at said first, second, fourth and shift register means only if said shift register means is less than full; and
- fifth means coupled to the output of said shift register means for converting said symbol data word to a series-sequential set of signals representing those dots of said dot matrix to be printed by said printer.

5. A controller as set forth in claim 4, wherein said CPU generates a synchronization signal during its synchronization time interval; said shift register means generates a signal therefrom if said shift register means is less than full; and said control means comprises a logical AND gate having an output normally enabled to said first condition and having first and second inputs respectively receiving said synchronization and shift register signals enabling said output to said second condition.

6. A controller as set forth in claim 5, wherein said shift register means further includes a shift-in control input enabling receipt of a symbol data word from said memory means into said shift register means only when said gate output is enabled.

7. Apparatus as set forth in claim 5, wherein at least one of said first, second and fourth means each comprises a buffer having an input coupled to the associated one of the CPU address and data ports and said third means, an output coupled to an associated one of the address and data ports of said memory means, and a control input coupled to said control means; each said buffer having signals at the output thereof controlled by signals at the input thereof only when said control input is enabled to the proper one of said first and second conditions; each said buffer output being essentially disconnected from the associated input whenever said control input is enabled to provide the presence of the remaining one of said first and second conditions.

8. A controller as set forth in claim 4, wherein said third means comprises: sixth means for storing a starting address of a block of storage containing symbol data words; and seventh means receiving the starting address from said sixth means for incrementing the location address, within said block, after each enablement of said control means and for providing to said memory means the address therein at which a data word characterizing the next sequential printable symbol is stored.

9. A controller as set forth in claim 4, wherein said fifth means comprises:
- means for generating periodic clock signals;
- read-only-memory means for converting a symbol data word received from said shift register means to a data word having individual sequential bits thereof representing the printing state of each dot of a row of a dot matrix symbol; and a shift register receiving the data word output of said read-only-memory means and having output means to which said bits are sequentially presented responsive to sequential pulses from said periodic clock signal generating means.

10. A controller as set forth in claim 9, wherein said printer prints a line of a plurality of said symbols, like rows of the dot matrix of each symbol being printed prior to printing of the next row of dots of the matrix symbols of each line, said fifth means further comprising: dot counter means coupled to said periodic clock signal generating means for enabling an output when a number of sequential clock pulses is equal to the maximum number of dot positions in each row of each symbol, each enablement of said dot counter means output causing said third means to address the location within the memory means at which a data word characterizing the next sequential printable symbol is stored; and character counter means coupled to said dot counter means for enabling said third means to the initial address of the storage block when like rows of all of said plurality of symbols of a line have been printed.

* * * * *